(12) United States Patent
Brown

(10) Patent No.: US 8,223,835 B2
(45) Date of Patent: Jul. 17, 2012

(54) CATEGORIZING MOVING OBJECTS INTO FAMILIAR COLORS IN VIDEO

(75) Inventor: Lisa M. Brown, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 1407 days.

(21) Appl. No.: 11/688,588

(22) Filed: Mar. 20, 2007

(65) Prior Publication Data

US 2008/0232685 A1 Sep. 25, 2008

(51) Int. Cl.
*H04N 1/56* (2006.01)
(52) U.S. Cl. ................................... 375/240.03
(58) Field of Classification Search ............. 375/240.03
See application file for complete search history.

(56) References Cited

U.S. PATENT DOCUMENTS

| 5,740,345 | A | 4/1998 | Danielson et al. |
| 6,424,370 | B1 * | 7/2002 | Courtney ................ 348/143 |
| 7,187,783 | B2 | 3/2007 | Moon et al. |
| 2002/0099721 | A1 | 7/2002 | Ganapathy et al. |
| 2003/0044062 | A1 | 3/2003 | Ganapathy et al. |
| 2003/0128298 | A1 | 7/2003 | Moon et al. |

FOREIGN PATENT DOCUMENTS

| JP | 62-092074 A | 4/1987 |
| JP | 2006-078261 A | 3/2006 |
| JP | 2006-227973 A | 8/2006 |
| JP | 2007-011696 A | 1/2007 |

OTHER PUBLICATIONS

Schettini, Raimondo et al. "A Survey on Methods for Colour Image Indexing and Retrieval in Image Databases", in: R. Luo and L. MacDonald(Eds.), Color Imaging Science: Exploiting Digital Media, John Wiley, 2001.
Wu, Gang et al. "Identifying Color in Motion in Video Sensors", Proc. IEEE CVPR, 2006.
Renno, John-Paul et al. "Application and Evaluation of Colour Constancy in Visual Surveillance", Proc. 2nd Joint IEEE International Workshop on VS-PETS, Beijing, Oct. 15-16, 2005. http://dircweb.king.ac.uk/papers/Renno_J. R.2005_313983/renno_vspets2005.pdf.
Arun Hampapur et al."Smart Video Surveillance". IEEE Signal Processing Magazine, vol. 22, No. 2, Mar. 2005.
Haoran Yi et al, "A New Motion Histogram to Index Motion Content in Video Segments", Pattern Recognition Letters, Elsevier, Amsterdam, NL, vol. 26, No. 9, Jul. 1, 2005, pp. 1221-1231.
Mark Stricker et al, "Similarity of Color Images", Proceedings of the SPIE—The International Society for Optical Engineering, SPIE, PO Box 10, Bellingham, WA 98227-0010, USA, vol. 2420, Feb. 9, 1995, pp. 381-392.
Information Materials for IDS for JP920070070JP1 dated Dec. 20, 2011.

* cited by examiner

*Primary Examiner* — Eleni Shiferaw
*Assistant Examiner* — Tamara Teslovich
(74) *Attorney, Agent, or Firm* — Hoffman Warnick LLC; Anna Linne

(57) ABSTRACT

An improved solution for categorizing moving objects into familiar colors in video is provided. In an embodiment of the invention, a method for categorizing moving objects into familiar colors in video comprises: receiving a video input; determining at least one object track of the video input; creating a normalized cumulative histogram of the at least one object track; and one of: performing a parameterization quantization of the histogram including separating the histogram into regions based on at least one surface curve derived from one of saturation and intensity; or identifying a significant color of the quantized histogram.

18 Claims, 4 Drawing Sheets

CATEGORIZING MOVING OBJECTS INTO FAMILIAR COLORS IN VIDEO

FIELD OF THE INVENTION

Aspects of the invention relate generally to video processing and color retrieval, and more particularly, to categorizing moving objects into familiar colors in video.

BACKGROUND OF THE INVENTION

Color retrieval is often based on retrieving images from a set of images. Typically, whole images are used. Occasionally, images are pre-segmented and then retrieval of objects is performed. Only recently, has work been performed to study the retrieval of moving objects from video based on color information. This work has been preliminary and has been limited by issues of color constancy, including changing lighting conditions, changing orientation of surfaces with respect to lighting, and the broad complexity of objects.

Color retrieval is typically based on predefined familiar colors, based on a query example or on color categorization derived from the color search space. The color retrieval often requires a query input or unsupervised learning, which both consume resources. Further, the requirement of having training data, specifically data which is manually or semi-automatically labeled for each set of cameras, views, lighting conditions or types of objects, is also inefficient.

These various color retrieval methodologies are also not adaptive. In order to work on a new camera, view, lighting condition or class of objects, there is an implicit requirement for additional training data to update the classification.

Additionally, color retrieval methods employ complex color distribution information to match images, regions or objects. For example, spatial color histograms are used to describe the color of complex objects. However, there are shortcomings with these methods because they do not adequately address several issues. The first is the issue of color constancy. People perceive an object to be the same color across a wide range of illumination conditions. However, the actual pixels of the object, while perceived to be the same color, may have values which range across the color spectrum depending on the lighting conditions. Second, moving objects extracted from video are not perfectly segmented from the background. Shadows are often part of the object and errors are caused in the segmentation due to the similarity of the object and background model. Lastly, complex objects are not predominately one color. Certain aspects of objects are of interest to the human and these depend on the type of object and application. All of these deficiencies make it difficult to select moving objects based on familiar color descriptors.

In view of the foregoing, a need exists to overcome one or more of the deficiencies in the related art.

BRIEF SUMMARY OF THE INVENTION

Aspects of the invention provide an improved solution for categorizing moving objects into familiar colors in video. In an embodiment of the invention, a method for categorizing moving objects into familiar colors in video comprises: receiving a video input; determining at least one object track of the video input; creating a normalized cumulative histogram of the at least one object track; and one of: performing a parameterization quantization of the histogram including separating the histogram into regions based on at least one surface curve derived from one of saturation and intensity; or identifying a significant color of the quantized histogram.

A first aspect of the invention provides a method for categorizing moving objects into familiar colors in video comprising: receiving a video input; determining at least one object track of the video input; creating a normalized cumulative histogram of the at least one object track; and one of: performing a parameterization quantization of the histogram including separating the histogram into regions based on at least one surface curve derived from one of saturation and intensity; or identifying a significant color of the quantized histogram.

A second aspect of the invention provides a system for categorizing moving objects into familiar colors in video, the system comprising: a system for receiving a video input; a system for determining at least one object track of the video input; a system for creating a normalized cumulative histogram of the at least one object track; and one of: a system for performing a parameterization quantization of the histogram including separating the histogram into regions based on at least one surface curve derived from one of saturation and intensity; or a system for identifying a significant color of the quantized histogram.

A third aspect of the invention provides a computer program comprising program code stored on a computer-readable medium, which when executed, enables a computer system to implement a method of categorizing moving objects into familiar colors in video, the method comprising: receiving a video input; determining at least one object track of the video input; creating a normalized cumulative histogram of the at least one object track; and one of: performing a parameterization quantization of the histogram including separating the histogram into regions based on at least one surface curve derived from one of saturation and intensity; or identifying a significant color of the quantized histogram.

A fourth aspect of the invention provides a method of generating a system for prioritizing conference call participants, the method comprising: providing a computer system operable to: receive a video input; determine at least one object track of the video input; create a normalized cumulative histogram of the at least one object track; and one of: perform a parameterization quantization of the histogram including separating the histogram into regions based on at least one surface curve derived from one of saturation and intensity; or identify a significant color of the quantized histogram.

A fifth aspect of the invention provides a data processing system for categorizing moving objects into familiar colors in video, comprising: a processing unit; a bus coupled to the processing unit; and a memory medium coupled to the bus comprising program code, which when executed by the processing unit causes the data processing system to: receive a video input; determine at least one object track of the video input; create a normalized cumulative histogram of the at least one object track; and one of: perform a parameterization quantization of the histogram including separating the histogram into regions based on at least one surface curve derived from one of saturation and intensity; or identify a significant color of the quantized histogram.

A sixth aspect of the invention provides computer software embodied in at least one propagated signal for categorizing moving objects into familiar colors in video, the at least one propagated signal comprising instructions for causing at least computer system to: receive a video input; determine at least one object track of the video input; create a normalized cumulative histogram of the at least one object track; and one of: perform a parameterization quantization of the histogram including separating the histogram into regions based on at least one surface curve derived from one of saturation and intensity; or identify a significant color of the quantized histogram.

A seventh aspect of the invention provides a business method for categorizing moving objects into familiar colors in video, the business method comprising: managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for categorizing moving objects into familiar colors in video. In an embodiment of the invention, a method for categorizing moving objects into familiar colors in video comprises: receiving a video input; determining at least one object track of the video input; creating a normalized cumulative histogram of the at least one object track; and one of: performing a parameterization quantization of the histogram including separating the histogram into regions based on at least one surface curve derived from one of saturation and intensity; or identifying a significant color of the quantized histogram. As used herein, unless otherwise noted, the term "set" means one or more (i.e., at least one); and, the phrase "any solution" means any now known or later developed solution.

Aspects of the invention provide for the categorizing of moving objects into, for example, one of a small number of predefined and/or normative colors. Aspects of the method are based on collecting a normalized cumulative color histogram for each object track and its conversion to cylindrical (hue, saturation, intensity) HSI space. Aspects of the invention describe mechanisms to divide this space intelligently, via parameterization, which can be set by a user or by active color measurements of the scene. The ability to intelligently discretize color space is based on using the relationships between hue, saturation and intensity. As color information may be limited by both lack of saturation and intensity, aspects of the method of the present invention separate color space along surfaces defined by a function of saturation and intensity in the cylindrical space. Learning the significant colors of interest is also based on user parameters or can be derived using information accumulated from classes of moving objects which are "tracked" in the foreground of the scene. Aspects of the invention thereby allow for the beneficial selection of moving object events based on familiar color, and/or familiar color descriptors.

Figure 1:
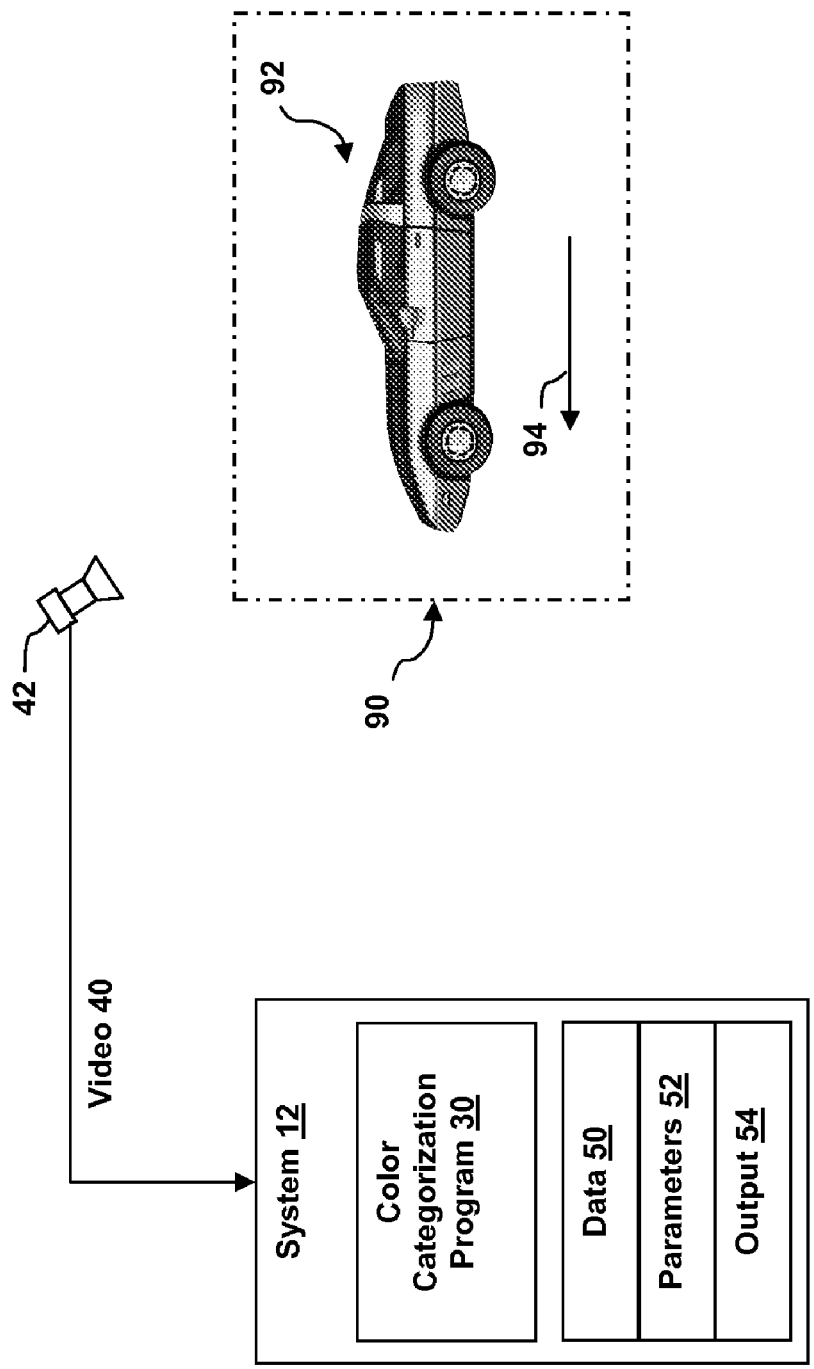
FIG. 1 shows an illustrative environment for a system for categorizing moving objects into familiar colors in video according to an embodiment of the invention.

Turning to the drawings, FIG. 1 shows an illustrative environment for categorizing moving objects into familiar colors in video according to an embodiment of the invention. To this extent, at least one camera 42 captures a scene, or background 90. Often, the background, or scene 90 may include at least one object 92 (or, object track), such as, a vehicle, person, animal, and/or the like that is moving, as denoted by 94. A digital video input 42 is obtained and sent to a system 12 that includes, for example, a color categorizing program 30, data 50, and/or the like, as discussed herein.

Figure 2:
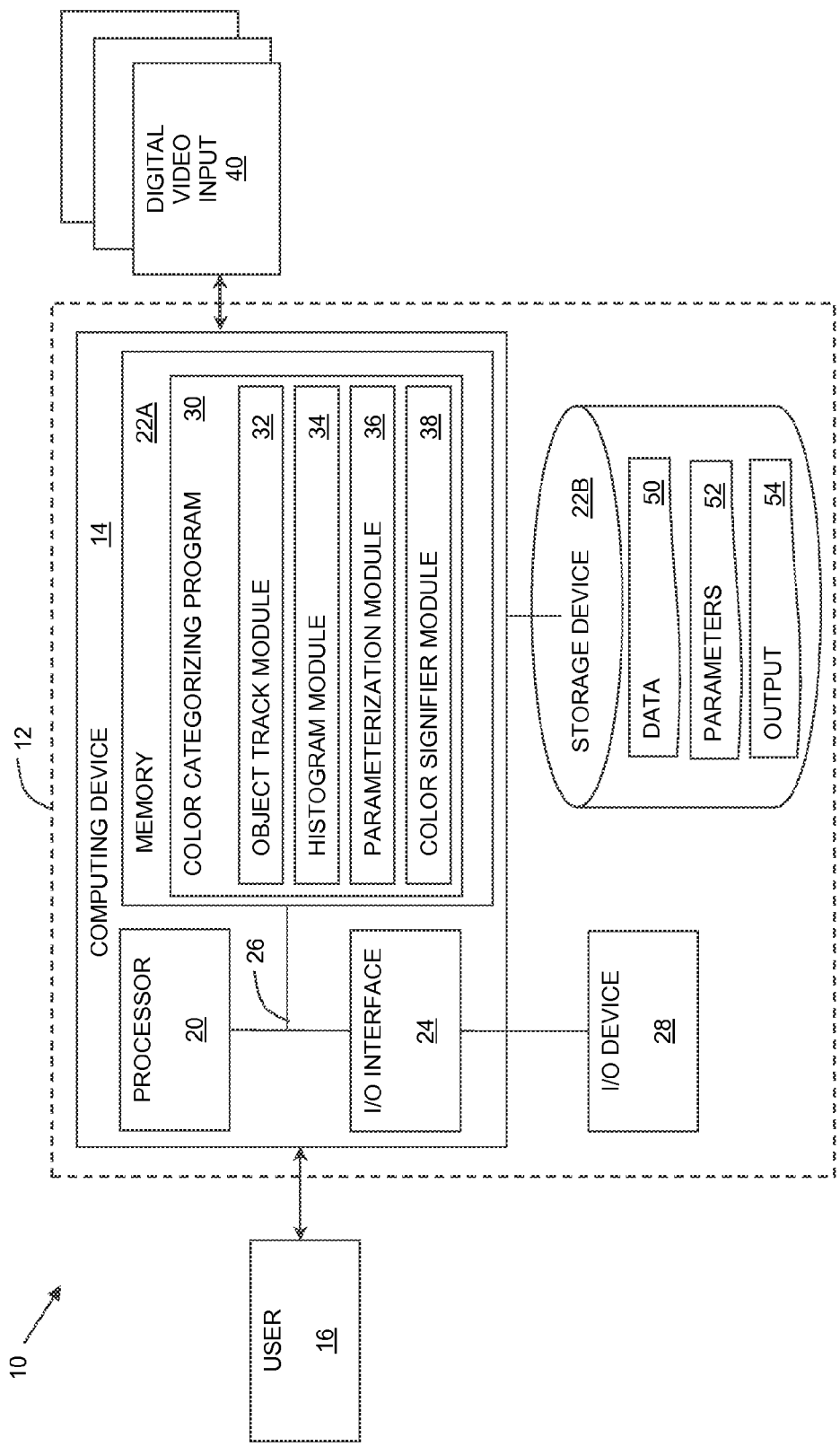
FIG. 2 shows a close up of an illustrative environment for categorizing moving objects into familiar colors in video according to an embodiment of the invention.

FIG. 2 shows a closer view of an illustrative environment 10 for categorizing moving objects 92 (FIG. 1) into familiar colors in video 40 according to an embodiment of the invention. To this extent, environment 10 includes a computer system 12 that can perform the process described herein in order to categorize moving objects 92 into familiar colors in video 40. In particular, computer system 12 is shown including a computing device 14 that comprises a color categorizing program 30, which makes computing device 14 operable for categorizing moving objects 92 (FIG. 1) into familiar colors in video 40, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as color categorizing program 30, which is stored in a storage system, such as memory 22A and/or storage device 22B. While executing program code, processor 20 can read and/or write data, such as data 36 to/from memory 22A, storage device 22B, and/or I/O interface 24. Bus 26 provides a communications link between each of the components in computing device 14. I/O device 28 can comprise any device that transfers information between a user 16 and computing device 14 and/or digital video input 40 and computing device 14. To this extent, I/O device 28 can comprise a user I/O device to enable an individual user 16 to interact with computing device 14 and/or a communications device to enable an element, such digital video input 40, to communicate with computing device 14 using any type of communications link.

In any event, computing device 14 can comprise any general purpose computing article of manufacture capable of executing program code installed thereon. However, it is understood that computing device 14 and color categorizing program 30 are only representative of various possible equivalent computing devices that may perform the process described herein. To this extent, in other embodiments, the functionality provided by computing device 14 and color categorizing program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, color categorizing program 30 enables computer system 12 to categorize a moving object 92 (FIG. 1) into familiar color(s) in video 40. To this extent, color categorizing program 30 is shown including an object track module 32, a histogram module 34, a parameterization module 36, and a color signifier module 38. Operation of each of these modules is discussed further herein. However, it is understood that some of the various modules shown in FIG. 2 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Figure 3:
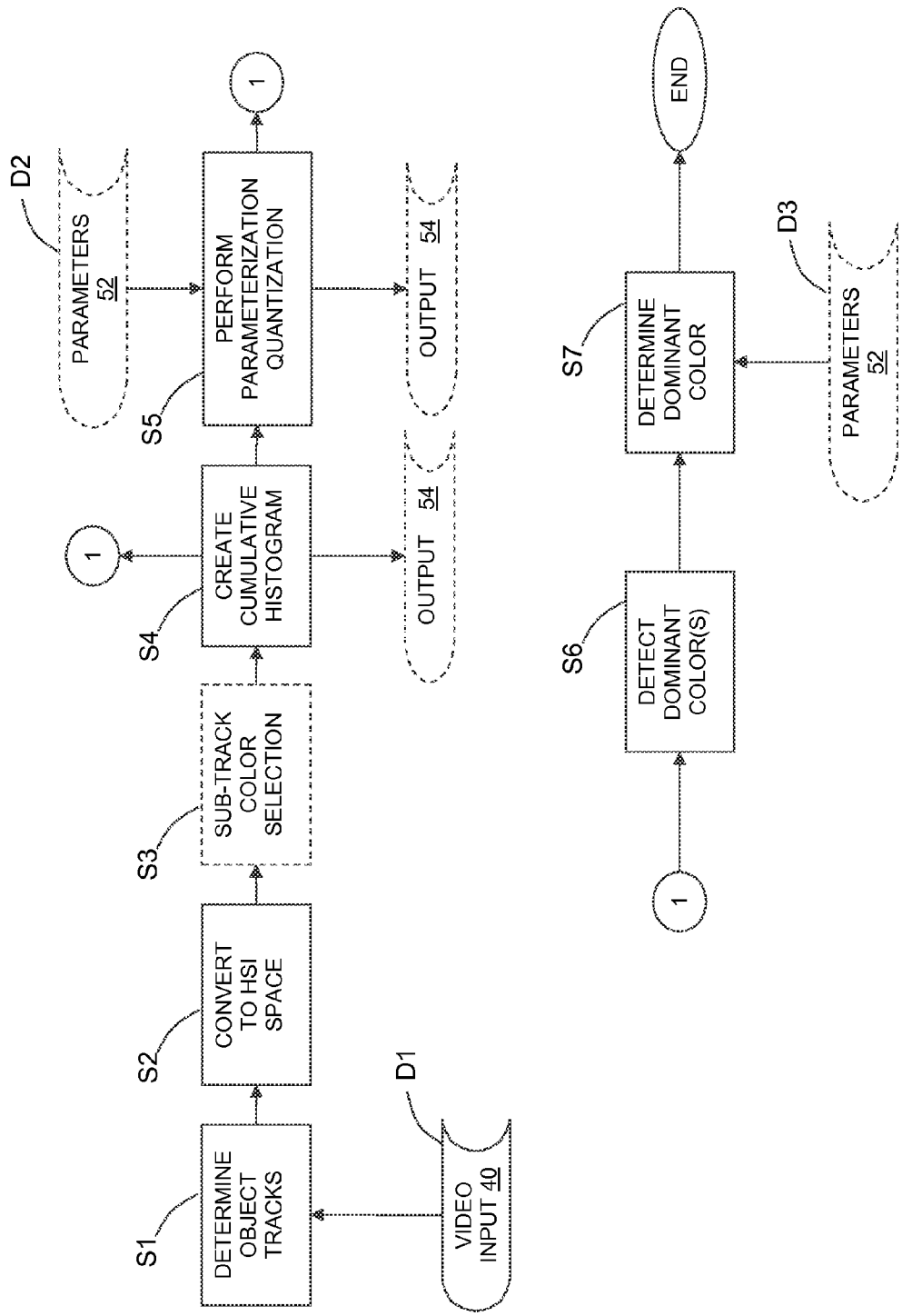
FIG. 3 shows an illustrative data flow for categorizing moving objects into familiar colors in video according to an embodiment of the invention.

Aspects of the invention provide an improved solution for categorizing moving objects 92 (FIG. 1) into familiar colors in video 40. To this extent, FIG. 3 shows an illustrative data flow for categorizing moving objects 92 (FIG. 1) into familiar colors in video 40 by using the modules of color categorizing program 30 (FIG. 2), according to an embodiment of the invention. For example, the system 12, at D1, receives digital color video input 40. Digital color video input 40 is typically in red-green-blue (RGB) format and at each time instance a frame of video input arrives at the Object Track Module 32 (FIG. 2).

At S1, Object Track Module 32 (FIG. 2) analyzes the frames in real-time, or a delayed mode, to determine all of the object tracks 92 (FIG. 1) occurring in the digital color video input 40. An object track 92 comprises a set of segmented objects, one per frame, associated across a set of subsequent frames. For example, an object track 92 may be the instance of a car or a person as it crosses, or moves across, and/or in 92 (FIG. 1) the scene 90 (FIG. 1). The Object Track Module 32 (FIG. 2) may further comprise at least two parts: a background subtraction module which outputs the segmented foreground "blobs" (e.g., adjacent pixels which are significantly different than the background model); and, a tracker module which associates the segmented foreground "blobs" to construct the object tracks 92. Foreground "blobs" may be merged, split, and/or re-arranged according to the models used by the tracker module to best determine the moving object tracks 92 in the scene 90.

The object track 92 may contain color information per pixel. This is typically 3 8-bit colors associated with red, green and blue. Another common representation is luminance/bandwidth/chrominance (YUV), or luminance/chrominance space. At S2, the object track module 32 converts the pixel colors into a Hue/Saturation/Intensity or HSI (sometimes called HSV) space. A standard nonlinear conversion method now known, or later developed, may be used to convert to the HSI space.

In order to make the method computationally feasible for real-time systems, S3 may optionally be included, wherein the object track module 32 further comprises a sub-track color selection module, which sub samples the frames of the HSI object track 92 in real-time. The sub-track color selection module does not necessarily know ahead of time how long the track will be. In this manner the sub-track color selection module initially acquires color information frequently and gradually decreases this frequency as the track's life continues. In this manner, the track is assured of sufficient samples for the case in which its duration is short, but is periodically updated so that a spread of data throughout the life of the track is sampled in the case where the life of the track is longer. The following geometric formula may be used for sampling: $i > S + M*2^n$ (Eq. 1-1).

In equation 1-1, i is the number of frames in the object track so far, and S is a constant equal to the number of frames needed before sampling starts. The latter is based on the minimum number of frames to assure that the track is now in a stable state. This parameter may be replaced by other information obtained from the Object Track Module 32. The constant M is the initial number of frames to skip (after the first S frames) and the number which will subsequently be successively doubled before the next sampling. The iterator n is initially set to 0 and is incremented each time equation 1-1 is satisfied.

For example, if the video 40 has a frame rate of 30 frames per second, S=60 (2 seconds) and M=5, then the object track will be sampled at 60, 65, 70, 80, 100, 140 180 (and so on) frames. Sampling will start after the track has stabilized, it will be sampled frequently at first and then gradually more and more slowly.

At S4, a normalized cumulative histogram in HSI space for the object track based on the sub HSI object track output at S2 (or at S3 if employed) is created by histogram module 34. As each frame of the HSI object track enters histogram module 34 it is accumulated in the HSI histogram for this object track and continuously normalized. For example, 8×8×8 bins may be used. Optionally, the histogram module 34 may produce output 54, which may assist in the development of parameters 52 (D2 and/or D3). The method may then proceed to either S5 or directly to S6.

Figure 4B:
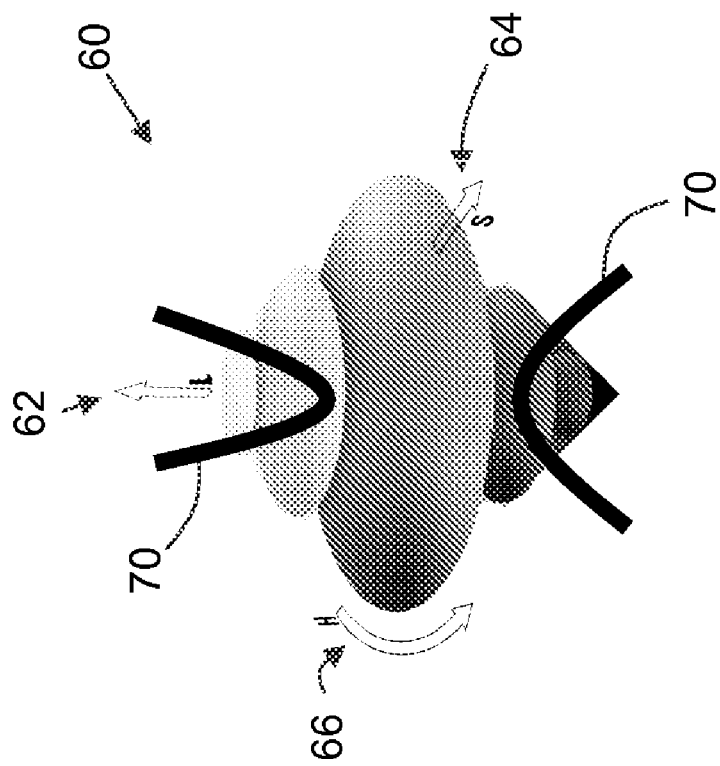
FIGS. 4A and 4B show illustrative color spaces according to embodiments of the invention.
Figure 4A:
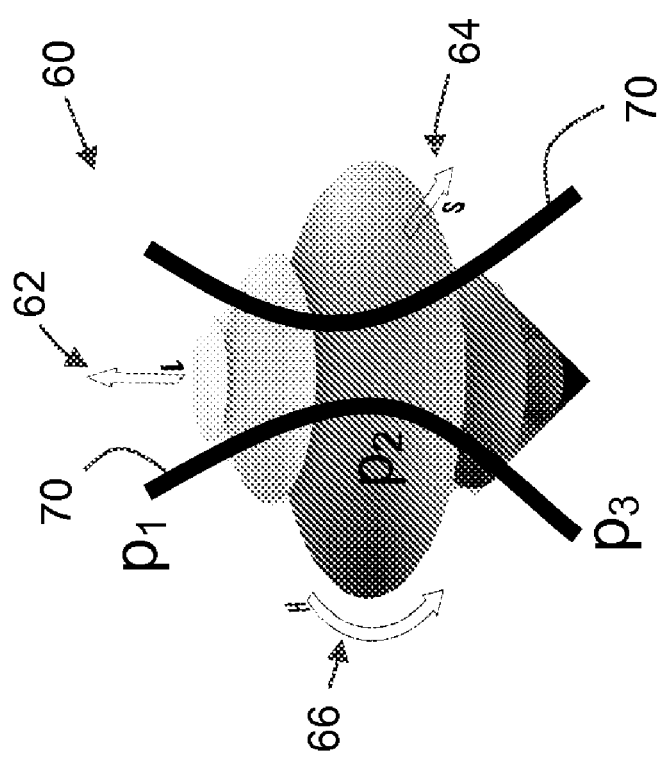

At S5, the parameterization module 36 (FIG. 2) performs a parameterized quantization on each track histogram. This may occur at the point at which the track has ended and the final histogram has been computed. The quantization is hierarchical. First, a parameterized separation of chromatic and achromatic color space regions is achieved. Then, each sub-region is further separated. The chromatic/achromatic separation is based on a family of curves that split HSI space 60 (FIGS. 4A, 4B) along saturations level which differ with intensity. An example of one member of this family of curves 70 is shown (in cross-section) in FIG. 4A. Intensity 62, saturation 64, and hue 66 are depicted in the HSI space 60. For example, where the intensity 62 is very great or very low, the saturation level 64 needed for inclusion in the chromatic region is much higher. For intensities 62 in the middle region, the saturation level 64 no longer needs to be very high. This may actually vary to some extent with hue 66 for certain camera/view/illumination conditions. However, this curve 70 may vary according to the parameters so that the vase-like region extracted as achromatic becomes narrower and narrower or even becomes two conic regions. An example of this type of family member, or curve 70, is shown in FIG. 4B. There are several ways the parameters used to create this family of curves 70 can be defined. One simple example which can be used in cases where the histogram is relatively small, is to explicitly constrain the saturation boundaries for each intensity level 62. Another possibility is a bi-linear or simple curve model based on interpolating from the circles p1, p2, and p3 shown in FIG. 4A. Once this separation is performed, each subregion is further decomposed. The achromatic region can be separated into a small number of grey levels based on thresholds. The chromatic region is separated into various hues based on the number of specified hues and their corresponding wavelengths. For lighting conditions which introduce artificial coloration, the color separation can be skewed accordingly.

Alternatively to S5, or subsequent to S5, the method at S6 includes a color signifier module 38 (FIG. 2) computing, or detecting, a small number (e.g., three) of dominant colors found in the quantized track histogram. In an embodiment, this is based on finding the highest peaks or modes in the histogram.

At S7, the color signifier module 38 (FIG. 2) also determines a single dominant color of the object track based on the dominant colors found at S6. The color signifier module 38 addresses two of the problems mentioned with the prior art. The first problem arises from the difficulty in segmenting the true object from the background. Often shadows are included and part of the object is lost or part of the background is erroneously included because of camouflage errors. Camouflage errors are due to the similarity of the background and foreground objects. The second problem is due to fact the moving objects are often complex, containing many components, each of which may be many colors. They are not, in fact, even by human perception (i.e., without the issue of color constancy) predominately one color. However, people can (and do) classify such complex objects as one of a few normative colors. A good example of this is in the case of vehicle color recognition. Although the typical car is often predominately black or silver because of the tires, windows, windshield, and bumpers (not to mention shadows, reflections, and erroneous inclusions of pieces of the road or background), people frequently refer to vehicles based on the color of the body of the car. Similarly, people find it helpful to classify people entering a retail environment according to the color of their coats or jackets.

The color signifier module 38 performs significant color detection by allowing the user 16 (or system 12) to specify thresholds which indicate the amount of black, white and color needed to account for each to be the significant color. Hues are selected over achromatic regions if their amount is sufficient (which may be very small). Also, different thresholds are used to decide if different colors are present based on parameters related to the difficulty to discern different colors. For example, black, green, purple and grey may be more difficult to distinguish than red, yellow, orange, pink and white. In this manner the color signifier module 38 can provide feedback in the various embodiments of the invention.

In another embodiment, the user 16 may explicitly specify the parameters 52, at D2, to quantize the track histogram.

In another embodiment, the user 16 may specify the parameters 52 with feedback visualization of the discretization of color space directly on the object tracks and/or the classification of the object tracks into color categories which are stored in data 50. In all of these embodiments discussed herein, a system such as the IBM Smart Surveillance System [S3] can be used to access the intermediate and final results of the object tracking, track color histogramming, quantization and/or categorization. Such a system, can allow a user to quickly and visually inspect the current results of parameterization and immediately get feedback as to the effect of changes to this parameterization. In an embodiment, the user 16 may interactively modify the parameterization of the color space and examines how the pixels of object tracks are then discretized in color space and/or classified into familiar colors.

In another embodiment, the parameters 52 (FIG. 3) are derived from the track histogram output 54 (FIG. 3) from the histogram module 34 creating the cumulative histogram at S4.

In another embodiment, the object color distributions may be used to optimally specify the parameters which quantize color space. This can be done automatically or with user feedback but no longer requires re-evaluation of the video/scene/camera/lighting condition. If color distribution information is gathered over longer periods over changing conditions, this information can be used to learn the relative differences in the parameters necessary to optimize the color categorization.

In another embodiment, the invention provides a computer program stored on a computer-readable medium, which when executed, enables a computer system to categorize moving objects 92 (FIG. 1) into familiar colors in video 40. To this extent, the computer-readable medium includes program code, such as color categorizing program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for categorizing moving objects 92 (FIG. 1) into familiar colors in video 40. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that categorizes moving objects 92 (FIG. 1) into familiar colors in video 40, which enables users to perform the process described herein on a subscription, advertising, and/or fee basis. That is, a service provider could offer to manage a network and/or a computer system 12 (FIG. 1) that allows users to categorize moving objects 92 (FIG. 1) into familiar colors in video 40 as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for categorizing moving objects into familiar colors in video comprising:
   receiving a video input;
   automatically determining, using a computer device, at least one object track of the video input, each of the at least one object track tracking a movement of an object within the video input;
   creating a normalized cumulative histogram of the at least one object track;
   one of:
      performing a parameterization quantization of the histogram including separating the histogram into regions based on at least one surface curve derived from one of saturation and intensity; or
      identifying a significant color of the histogram; and
   sub sampling a plurality of frames of the at least one object track according to the equation $i>S+M*2^n$, where i is a current number of frames in the object track, S is a constant based on a number of frames needed before sampling starts, M is an initial number of frames that can be skipped, and n is an iterator.

2. The method of claim 1, further comprising outputting one of the parameterization quantization and the significant color.

3. The method of claim 1, the performing comprising:
   separating a color space into chromatic and achromatic regions; and
   dividing the regions using at least one threshold.

4. The method of claim 1, the performing comprising setting quantization parameters that include one of a feedback visualization of discretization of a color or color classification results of moving objects from a database.

5. The method of claim 1, further comprising using an output of the histogram to derive one of quantization and significant color identification parameters.

6. The method of claim 1, further comprising converting the at least one object track to a hue/saturation/intensity (HSI) space.

7. The method of claim 1, the identifying comprising selecting hue over black and white using a per color threshold.

8. The method of claim 1, the determining comprising:
   outputting a segmented foreground region; and
   associating the segmented foreground region to the at least one object track.

9. A system for categorizing moving objects into familiar colors in video, the system comprising:
   a system for receiving a video input;
   a system for automatically determining at least one object track of the video input, each of the at least one object track tracking a movement of an object within the video input;
   a system for creating a normalized cumulative histogram of the at least one object track;
   one of:
      a system for performing a parameterization quantization of the histogram including separating the histogram into regions based on at least one surface curve derived from one of saturation and intensity; or
      a system for identifying a significant color of the histogram; and
   a system for sub sampling a plurality of frames of the at least one object track according to the equation $i>S+M*2^n$, where i is a current number of frames in the object track, S is a constant based on a number of frames needed before sampling starts, M is an initial number of frames that can be skipped, and n is an iterator.

10. The system of claim 9, further comprising a system for outputting one of the parameterization quantization and the significant color.

11. The system of claim 9, the system for performing comprising:
   a system for separating a color space into chromatic and achromatic regions; and
   a system for dividing the regions using at least one threshold.

12. The system of claim 9, the system for performing comprising a system for setting quantization parameters that include one of a feedback visualization of discretization of a color or color classification results of moving objects from a database.

13. The system of claim 9, further comprising a system for using an output of the histogram to derive one of quantization and significant color identification parameters.

14. The system of claim 9, further comprising a system for converting the at least one object track to a hue/saturation/intensity (HSI) space.

15. The system of claim 9, the system for identifying comprising a system for selecting hue over black and white using a per color threshold.

16. The system of claim 9, the system for determining comprising:
   a system for outputting a segmented foreground region; and
   a system for associating the segmented foreground region to the at least one object track.

17. A computer program comprising program code stored on a computer-readable device, which when executed, enables a computer system to implement a method of categorizing moving objects into familiar colors in video, the method comprising:
   receiving a video input;
   automatically determining at least one object track of the video input, each of the at least one object track tracking a movement of an object within the video input;
   creating a normalized cumulative histogram of the at least one object track;
   one of:
      performing a parameterization quantization of the histogram including separating the histogram into regions based on at least one surface curve derived from one of saturation and intensity; or identifying a significant color of the histogram; and sub sampling a plurality of frames of the at least one object track according to the equation $i > S + M*2^n$, where i is a current number of frames in the object track, S is a constant based on a number of frames needed before sampling starts, M is an initial number of frames that can be skipped, and n is an iterator.

18. A method of generating a system for categorizing moving objects into familiar colors, the method comprising:

providing a computer system operable to:

receive a video input;

automatically determine at least one object track of the video input, each of the at least one object track tracking a movement of an object within the video input;

create a normalized cumulative histogram of the at least one object track;

one of:

perform a parameterization quantization of the histogram including separating the histogram into regions based on at least one surface curve derived from one of saturation and intensity; or identify a significant color of the histogram; and sub sample a plurality of frames of the at least one object track according to the equation $i > S + M*2^n$, where i is a current number of frames in the object track, S is a constant based on a number of frames needed before sampling starts, M is an initial number of frames that can be skipped, and n is an iterator.

* * * * *